Figure 3:
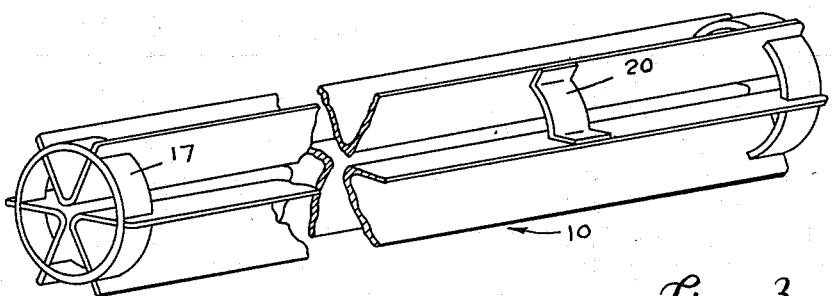

Nov. 24, 1959 D. H. GURINSKY ET AL 2,914,454
NEUTRONIC REACTOR FUEL ELEMENT
Filed Aug. 9, 1956 2 Sheets-Sheet 1

INVENTOR.
DAVID H. GURINSKY
ROBERT W. POWELL
MARVIN FOX

Nov. 24, 1959  D. H. GURINSKY ET AL  2,914,454
NEUTRONIC REACTOR FUEL ELEMENT
Filed Aug. 9, 1956  2 Sheets-Sheet 2

INVENTOR.
DAVID H. GURINSKY
ROBERT W. POWELL
MARVIN FOX
BY

United States Patent Office 2,914,454
Patented Nov. 24, 1959

2,914,454

NEUTRONIC REACTOR FUEL ELEMENT

David H. Gurinsky, Center Moriches, Robert W. Powell, Sayville, and Marvin Fox, Bellport, N.Y., assignors to the United States of America as represented by the United States Atomic Energy Commission Application August 9, 1956, Serial No. 603,202

6 Claims. (Cl. 204—193.2)

The present invention relates to an improved fuel element for a nuclear reactor.

A nuclear reactor generally contains a quantity of a fissionable material distributed through a matrix of a moderating substance such as heavy or light water or graphite. A number of arrangements in which a reactor matrix may be formed are described in the patent of Fermi, No. 2,708,656. It is necessary in order to operate such a reactor that heat be removed from the elements containing the fissionable material. It is desirable in this connection that the fuel element be capable of transferring heat to a cooling medium at a high rate particularly where gaseous cooling media are employed. It is also desirable, and may in some instances be necessary, that none of the fuel or fission products be transferred to the cooling medium.

It is accordingly one of the objects of the present invention to provide a fuel element which can contain fissionable material with very little danger of loss of the fissionable material to the cooling medium passed into contact therewith. It is another object of the invention to provide an element which presents a large surface to the cooling medium. It is a further object to provide an element which can be incorporated in a reactor to permit the generation of relatively high neutron flux. Still another object is to provide a fuel element which can be cooled by gaseous coolant. Other objects will be in part apparent and in part pointed out in the description which follows.

In general the objects of the present invention are achieved by providing a fuel element to occupy an elongated volume, comprising a plurality of metal strips extending longitudinally of said volume, each of said strips containing a nuclear fuel in an active central portion extending through the length thereof, an enveloping sheath bonded to the active portion, said sheath having a wide edge portion and being composed of a metal having a low neutron cross section, a plurality of said strips being bent longitudinally through an angle of at least 10°, and means for supporting said strips in an array uniformly spaced in said volume to permit axial flow of coolant freely through the length of said volume, said means being attached to the edge portions of said strips.

Figure 1:
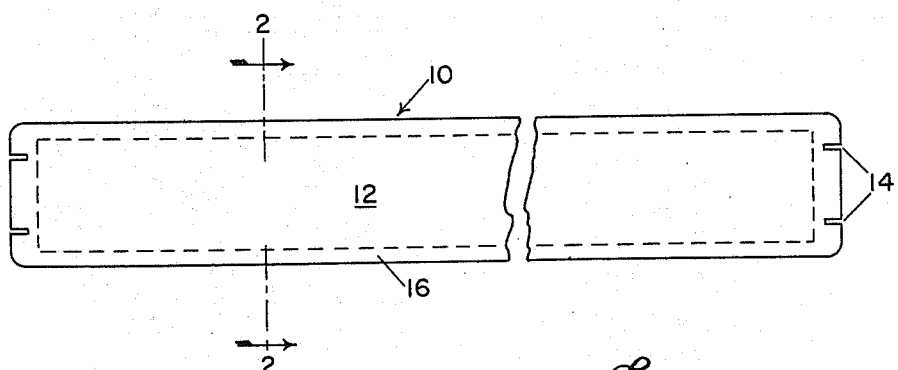
Figure 2:
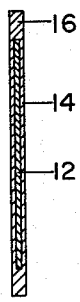
Figure 4:
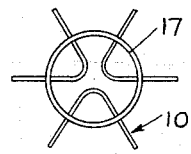
Figure 5:
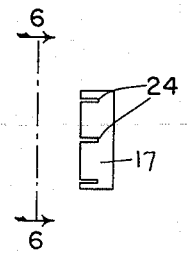
Figure 6:
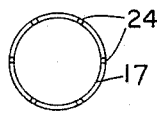

The description of particular embodiments of the invention is given with reference to the accompanying drawings in which:

Figure 1 is a longitudinal plan view of a fuel element plate prior to being formed into a component of the fuel element, Figure 2 is an enlarged cross section of the plate of Figure 1 taken along the line 2—2 of Figure 1, Figure 3 is a perspective view of one configuration of a fuel element as provided by the present invention, Figure 4 is an end elevational view of the element of Figure 3, Figure 5 is a side elevational view of a notched ferrule ring, Figure 6 is an axial elevational view of the ring of Figure 5 taken along the line 6—6 of Figure 5, and Figures 7, 8, 9, 10 and 11 are end elevational views of other configurations of fuel elements as provided by the present invention.

Referring first to Figure 1, a component of a fuel element is shown having the form of an elongated strip 10. The strip has an inner active core portion 12 indicated by the region within the dashed line of Figure 1 and the hatched inner section of Figure 2. The core is enclosed within a protective sheath 14 of a metal which is inert to the cooling medium which contacts it. The active core portion contains the nuclear fuel. This may be plutonium or uranium 233 or 235, with or without quantities of the non-fissionable isotopes of uranium or thorium.

The fuel may be present in the form of an alloy with a metal which is relatively inert to the cooling medium to be passed into contact with the element. Alternatively, the fuel metal may be present in the form of a compound of the metal such as an oxide. Whether present in metallic or compound form, the fuel is preferably dispersed in an inert metal. The fuel metal may, for example, be alloyed with the inert metal to form the core, or the compound of the fuel metal may be finely divided and dispersed in the inert metal and the composition heated and pressed to form a compact in which the compound is substantially homogeneously distributed through the inert metal. Where the inert metal is in the continuous phase, the compact retains the properties of the metal itself.

A core of this description is desirable because it imparts some of the metallurgical properties of the inert metal to the fuel; because it enhances the likelihood of retention of the fuel metal or fission products in the core in the event the sheath is punctured; and because it increases the strength of the bond between the core and the cladding sheath.

An outer peripheral edge portion 16 indicated by the region outside of the dashed line of Figure 1, extends an appreciable distance beyond the active core portion 12. It is preferred that the sheath, including the peripheral edge portion, be made of the metal alloyed or admixed with the fuel as this enhances the bonding between the active core portion and the enveloping sheath. Metals used for both alloying and sheathing should desirably have a high heat transfer coefficient as well as resistance to chemical attack by the coolant fluid. The heat transfer property is of secondary importance however because the configuration of the formed element itself enhances transfer of heat.

Although it is not necessary to fabricate the elements with the integral wide edge portion, a number of features of the elements result from its use where feasible. One feature is the increased safety of the formed element with regard to confining the fuel metal in minimizing reaction between the enclosed fissionable material and the flux or brazing composition which may be used to fabricate the elements from the strips. Another advantage is that the fabrication operations are facilitated. For example, this edge portion may be notched to permit easy fabrication by dovetailing the notches with notches of supporting elements.

The component strip as shown and described with reference to Figures 1 and 2 may be assembled into fuel elements of numerous configurations to gain the advantages of the subject invention. The facility and economy of fabrication possible with one configuration of an element is now described with reference to Figures 3, 4, 5 and 6. It will be evident that similar advantages are achieved in the fabrication of the other configurations of elements described below. In order to assemble the strips to form the fuel element, shown in Figures 3 and 4, they are first bent or folded along their longitudinal axis to form an angle of approximately 60°. After folding they are mounted in this form on a notched ferrule ring retainer 17 illustrated in Figures 5 and 6 to dovetail the notches in the strip ends with those in the rings. The rings are provided with notches 24 corresponding to the notches 14 of the strips of Figure 2. Three of the folded strips are joined to the ferrule ring retainers to form a six-prong centerless asterisk array of active fuel foils as illustrated in Figure 4. When assembled in this configuration, the strips are preferably arc tack welded to the ferrule rings. The welding does not penetrate to the fuel-containing, active core section of the plates because the joining is carried out only in the inert peripheral edge portion. When the three component strips have been bent and welded in place in the ferrule rings, the element is complete.

The component strips may be formed by rolling fuel element billets clad in the protective metal cladding. The wide edge makes the fabrication simpler while at the same time reduces any hazard of contaminating the coolant fluid. It is evident that this element offers advantages in simplicity and economy of fabrication coupled with a high degree of safety.

It may be desirable for certain applications to add additional supporting struts to the element particularly where the foils are of greater length and where the coolant is employed at a high velocity. These struts may be added in the form of braces between the outer inactive edge portions of the longitudinal edges of the strips so that the edge of one strip is mechanically joined to the edge of the adjoining strip. One such strut support, 20, is shown in Figure 3.

The formed element possesses a number of highly desirable and novel features not found in previously known elements. Principal among these features is the ability of the element composed of thin flexible components to retain its configuration in a rapidly moving coolant stream. The individual component strips 10 are relatively thin and have little mechanical strength to support themselves stably in a rapid stream of coolant. For example a fuel element such as that illustrated in Figure 3 was fabricated from component strips having a thickness of only six hundredths of an inch. However because of the mode of construction, the strip was able to transfer heat to a very rapidly flowing stream of air. This high stability of the elongated strips in a coolant stream is due to the form of the element particularly the longitudinal fold of the strip and the mounting of a plurality of the strips into a single integral unit.

Because the element is formed of strips which are relatively thin, there is very small temperature differential at various portions of the element. A maximum temperature differential of 10 to 20° C. may be expected between any two radial elements as shown in Figure 3 under normal conditions of operation in an air-cooled, graphite moderated reactor in a flux of about $10^{12}$ neutrons/cm.$^2$/sec.

Figure 7:
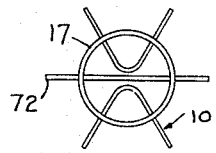

The foregoing example is given for illustrative purposes only. It is evident that numerous modifications of the configuration can be employed while retaining the advantages of the subject invention. One such modification which retains the symmetrical spacing of the strips in the defined volume together with the structural advantages of the bent strips is made by folding only two of the three component strips and disposing them on opposite sides of the unfolded third strip 72. This third strip is held between the two which are bent by the end ferrule rings as shown in Figure 7. The coolant flow for this, as well as the other elements described herein, is parallel to the length of the fuel element strips.

Other forms of the fuel elements are contemplated within the scope of the present invention. A number which may have particular merit with regard to special applications, as described below, are shown in end elevational views in Figures 8, 9, 10 and 11.

Figure 8:
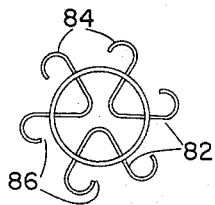

The configuration of Figure 8 illustrates the use of component strips similar to those shown in Figure 4 but which incorporate a number of additional advantages. It is noted that they are different in that they are formed with additional folds extending along each longitudinal edge. Referring to the Figure 8 each strip or foil 82 is formed by first folding a strip longitudinally along the foil axis to produce a rounded fold with the radially extending halves separated by a 60° angle. Each longitudinal edge portion 84 is bent or curved in a roughly semi-circular form to bring the edges 86 into the region of the element between the radially extending portions of the foils. Effectively this increases the surface area of the fuel element in the region of the enclosed volume containing the least amount of element. Accordingly the heat transfer surface of the element is increased while retaining the desired symmetry.

With regard to the rounded edges which are brought into contact with the fuel channel when the element is in place, it has been determined that for an element operating at a temperature of about 350° C. the difference in temperature from the free standing portion of the element to the portion contacting the channel wall does not exceed a temperature of about 20° C. It is further noteworthy that this difference in temperature favors the portion contacting the solid because the solid container wall is normally at a lower temperature and therefore the folded contacting edge of the element is lower in temperature by approximately 20° C. than the free standing portions of the element. This form of element thus makes possible the transfer of larger quantities of heat directly to the solid portion of the reactor core.

One additional advantage of this form of fuel element is that it may be easily rotated in a fuel channel in that the surfaces of the element contacting the channel surface are all bent in the same direction so that the sliding motion of the contacted surface necessary to rotation of the element is facilitated.

Figure 9:
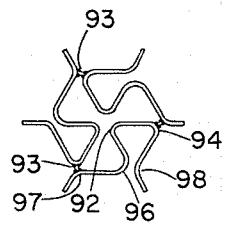

Referring now to Figure 9 a more complex form of element, which provides an even greater surface area than that provided in the configurations of Figures 4 and 8 is described. The individual foils in this case are formed by making 5 longitudinal folds in a flat foil such as that illustrated in Figure 1. A first fold 92 is made along the longitudinal axis of the foil and disposes the two sides at an angle of about 60° from each other. Two folds of approximately 60° are then made as illustrated at portions of the vanes 94 and 96 spaced from the center fold 92. The distances from the center fold 92 to the folds 94 and 96 are not the same but differ by an amount which provides a clearance between the fold 96 and the portion of the foil brought in proximity thereto in making the fold 94. An additional fold 97 is made on the vane proximate fold 96 to bring the edge portion of the vane into alignment with the portion of the opposite vane between folds 92 and 96, i.e. to align it radially from the center fold 92. A similar fold is made in the opposite vane at 98 to bring the edge of the vane similarly into radial alignment with the center fold 92. The other two foils of the element are of similar shape and are joined to the first described foil in the relative positions by means of the strut members 93.

It is known that the efficiency attained in producing power from a given quantity of heat by conventional means depends on the temperature at which the heat is available. More efficient power production may be achieved if the heat is supplied to a steam generating and turbine apparatus at higher temperature. One particular advantage of the forms of the fuel elements provided in accordance with the subject invention is that they permit higher temperature heat to be removed from the fuel than is possible with elements of more massive construction. For example, to remove heat from a fuel element having the form of a solid body of uranium or other fissionable material centrally positioned within a coolant flow channel, heat generated within the solid must pass through the body of the element in order to be removed at its surface. The temperature of the center of the element is the limiting temperature to which the element can be heated. An outer portion of the channel in this case will contain no fuel. By contrast the fuel is symmetrically disposed in the coolant channel occupied by the fuel element and the temperature of heat produced in the element is limited only by the relatively small temperature differentials referred to above and the melting point of the materials employed in the element.

Figure 10:
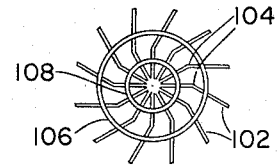

A configuration which provides a considerably larger surface area and a correspondingly larger fuel content within a flow channel is illustrated in Figure 10. A number of strips 102 such as that illustrated in Figure 1 but having smaller width than used in the strips of the elements described above are bent along their longitudinal axis through an angle of approximately 30° to form folds 104. The strips are then symmetrically spaced in an elongated cylindrical volume so that one edge of each strip is placed along the approximate central axis of the volume. As shown in Figure 10 approximately 12 folded foils 102 are employed although it is apparent that greater or smaller numbers may be employed. To hold the strips in the volume which they occupy two retainer rings 106 and 108 are attached at each end thereof in a manner similar to that described with reference to the element or Figure 4.

Figure 11:
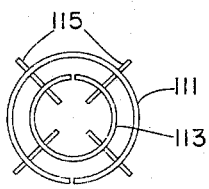

One additional configuration of an element such as is contemplated within the scope of the subject invention is shown in Figure 11. The symmetrical spacing of the fuel elements was achieved in this case by bending two strips such as 10 of Figure 1 into tubular form. The two strips are chosen to have different width so that a tube of greater diameter 111 and a tube of smaller diameter 113 are formed. These tubes are positioned concentrically and joined by the supporting elements 115 at their ends. A tongue and groove joint such as that described with reference to Figure 4 may also be employed for this purpose. The supporting elements act also as legs to support the element in the flow channel which it occupies.

It is apparent from the foregoing that fuel elements particularly suited for use in connection with the release of heat to rapidly moving coolant media are provided by the present invention.

Since many embodiments might be made in the present invention and since many changes might be made in the embodiment described, it is to be understood that the foregoing description is to be interpreted as illustrative only and not in a limiting sense.

We claim:

1. A fuel element adapted to occupy an elongated coolant flow channel which comprises a plurality of metal strips extending in the long direction of said channel, each of said strips having an active core portion containing a fissionable isotope of an element selected from the group consisting of uranium and plutonium extending through the length thereof, an inert metal sheath enveloping and bonded to the active portion, said sheath having a wide peripheral edge portion and being composed of a metal having a low neutron cross section, at least one portion of each of said strips being bent along its length through an arc to dispose one portion of the radially extending surface at an angle of at least 10°, with respect to another portion thereof, support means attached to the edge portion of said strips for supporting said strips in a uniformly spaced array in said channel to permit axial flow of coolant freely through the length of said channel, said means being attached to the edge portions of said strips.

2. A fuel element adapted to occupy an elongated coolant flow channel which comprises a plurality of metal strips extending in the long direction of said channel, each of said strips having an active core portion containing a fissionable isotope of an element selected from the group consisting of uranium and plutonium extending through the length thereof, an enveloping sheath bonded to the active portion, said sheath having a wide peripheral edge portion and being composed of a metal inert to the coolant passed through said channel and having a low neutron cross section, each of said strips being bent along the length to form tubes of greater and lesser diameters, holding means for disposing said strips in concentric array to permit axail flow of coolant fluid freely through the length of said channel, said means being attached at the end edge portions of said strips.

3. A fuel element adapted to occupy an elongated coolant flow channel which comprises a plurality of metal strips extending in the long direction of said channel, each of said strips having an active central portion extending through the length thereof, said channel containing an alloy of a fissionable isotope of an element selected from the group consisting of uranium and plutonium and a second metal having a low neutron cross section, an enveloping sheath of said second metal bonded to said active portion, said sheath having a wide edge portion extending around the periphery of said strip, each of said strips having at least two longitudinal bends, means for joining said strips in an array uniformly spaced transversely through the length of said channel, said means being attached at the edge portions of said strips.

4. A fuel element adapted to occupy an elongated cylindrical coolant flow channel which comprises three metal strips, each having an active central portion containing a fissionable isotope of an element selected from the group consisting of uranium and plutonium extending through the length thereof, an enveloping sheath bonded to the active portion, said sheath having a wide edge portion and being composed of a metal having a low neutron cross section and inert to the coolant flowing through said channel, each of said strips being folded along its longitudinal axis to an angle of about 60°, holding means for disposing said strips with their folded edges proximate the axis of said cylindrical channel in a uniformly spaced array to permit axial flow of coolant fluid freely through the length of said volume, said means being attached at the edge portions of said strips.

5. A fuel element adapted to occupy an elongated cylindrical coolant flow channel which comprises three metal strips each having an active central portion extending through the length thereof, said portion containing a compound of a fissionable isotope of an element selected from the group consisting of uranium and plutonium compacted with an inert metal having a low neutron cross section, an enveloping sheath bonded to the active portion of each of said strips, said sheath having a wide edge portion and being composed of said inert metal, each of said strips being folded along its longitudinal axis to an angle of about 60°, ferrule ring means for holding said strips in an array to dispose the flat portions of said strips in a centerless asterisk formation, said means being attached at the end edge portions of said strips.

6. A nuclear fuel element for use in elongated coolant flow channels comprising three metal strips, each of said strips having an active core portion containing a fissionable isotope of an element selected from the group consisting of uranium and plutonium disposed centrally along the length of the strip and a metal sheath bonded to and enveloping the core portion, said sheath having a relatively wide edge portion at the perimeter of the strip and said sheath being formed from a metal which has low neutron cross section and which is inert to a gaseous coolant flowed into contact therewith, each of said strips being bent along its longitudinal axis to an angle of approximately 60°, said strips being supported by ferrule rings attached at the end edge portions of said strips and disposed symmetrically in uniformly spaced array with the bent portions centrally of said volume, the longitudinal edges of said strips being bent into approximately semicircular formation.

References Cited in the file of this patent

UNITED STATES PATENTS

| | | |
|---|---|---|
| 2,034,822 | Morrow | Mar 24, 1936 |
| 2,322,341 | Booth | June 2, 1943 |
| 2,466,432 | Jenkins | Apr. 5, 1949 |
| 2,687,747 | Bock | Aug. 31, 1954 |

OTHER REFERENCES

Fox: Proceedings of the International Conference on the Peaceful Uses of Atomic Energy, pub. N.Y., August 1955, by United Nations Publications, vol. 2, pp. 353–371.

Cunningham et al.: Proceedings of the International Conference on the Peaceful Uses of Atomic Energy, N.Y., August 1955, by United Nations Publications, vol. vol. 9, pages 203–207.

Gurinsky et al.: Proceedings of the International Conference on the Peaceful Uses of Atomic Energy, pub. N.Y., August 1955, by United Nations Publications, vol. 9, pages 221–230.